United States Patent [19]
Fry

[11] 3,823,727
[45] July 16, 1974

[54] FOAMING SYSTEM AND IMPROVED FOAMING DEVICE

[75] Inventor: Arthur Francis Fry, Mount Waverley, Australia

[73] Assignee: Applied Chemicals Pty. Ltd., Hawthorn, Australia

[22] Filed: June 26, 1972

[21] Appl. No.: 266,041

[30] Foreign Application Priority Data
June 24, 1971 Australia.............................. 5302/71

[52] U.S. Cl..................... 137/88, 134/102, 137/7, 137/563
[51] Int. Cl........................ B08b 3/00, F16k 19/00
[58] Field of Search .............. 137/7, 88, 114, 170.2; 134/102; 169/14

[56] References Cited
UNITED STATES PATENTS

| | | | |
|---|---|---|---|
| 2,046,032 | 6/1936 | Muller | 137/170.2 |
| 3,037,887 | 6/1962 | Brenner et al. | 134/102 X |
| 3,115,158 | 12/1963 | Sheppard | 169/14 X |
| 3,559,688 | 2/1971 | Fischer et al. | 137/627.5 |

Primary Examiner—Robert G. Nilson
Attorney, Agent, or Firm—Ryder, McAulay, Fields, Fisher & Goldstein

[57] ABSTRACT

A foam cleaning system and a foam cleaner which is provided with a control actuated by build-up of static pressure in a foaming chamber to cut off air pressure to the chamber thus ensuring that during periods when foam is not being produced the pressure on the foamer hose is minimized. The foamer also has a facility whereby any tendency of leakage of liquid back into the air system is prevented and automatic purging takes place on the pressure drop in the foam chamber.

9 Claims, 7 Drawing Figures

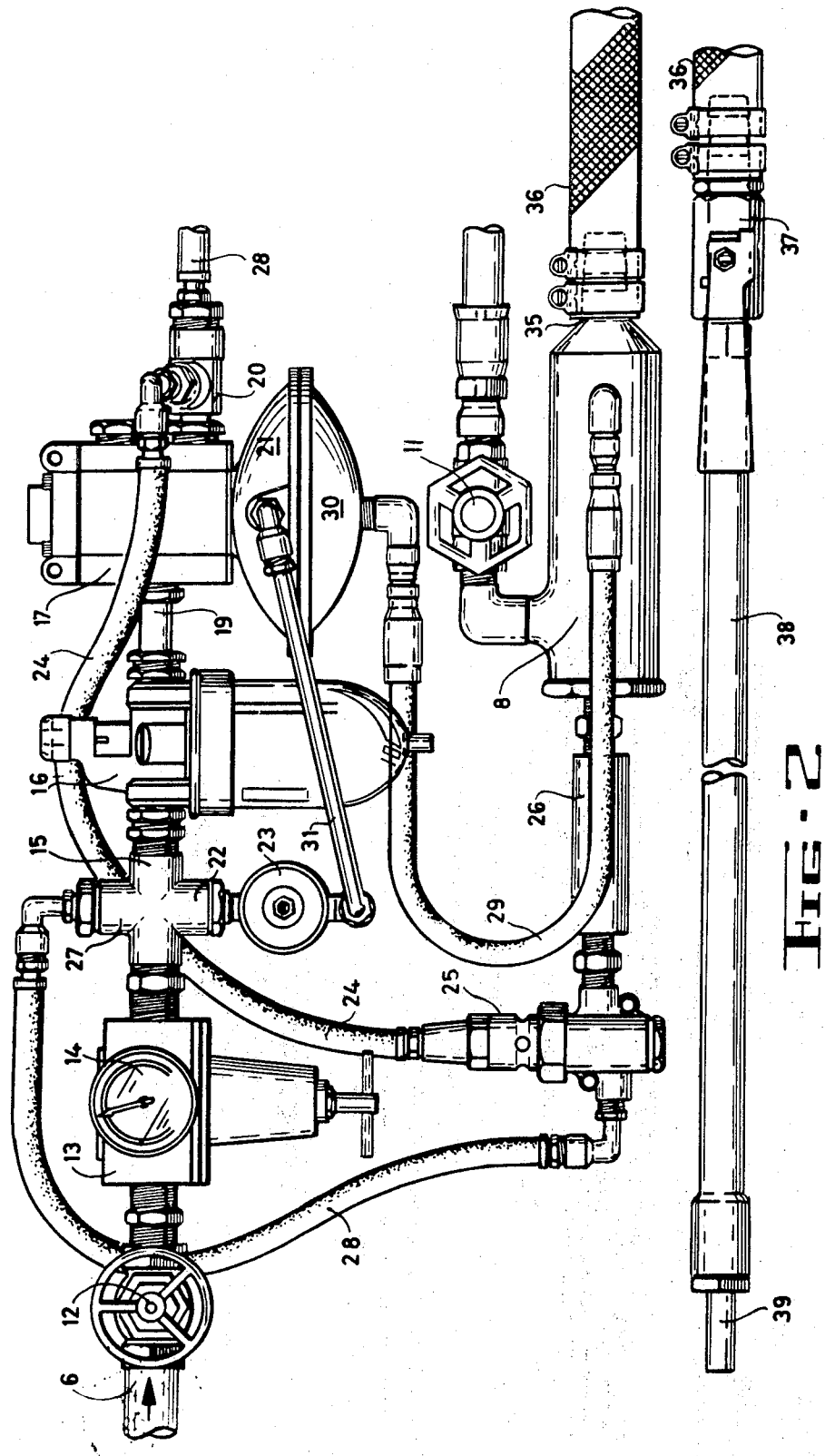

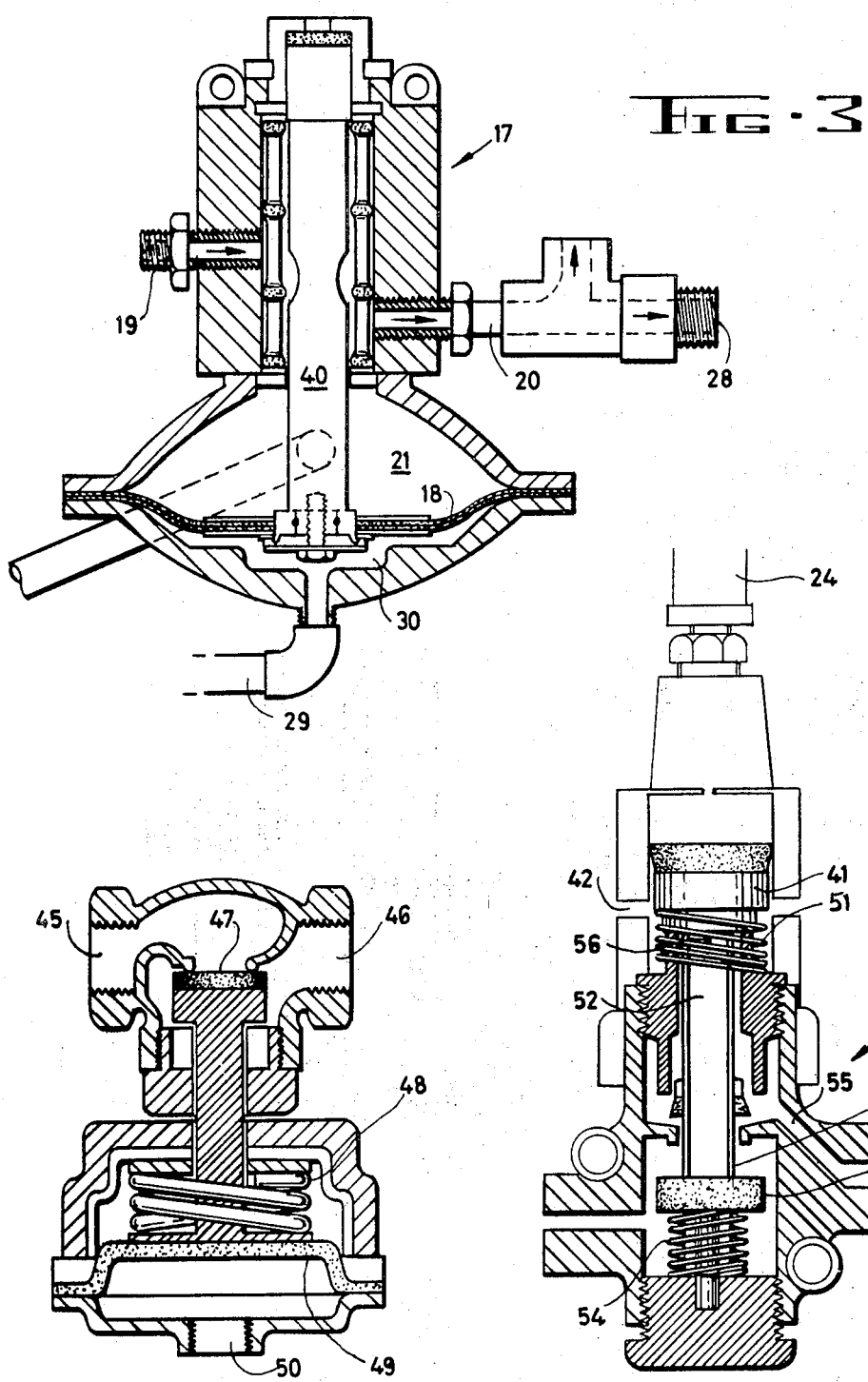

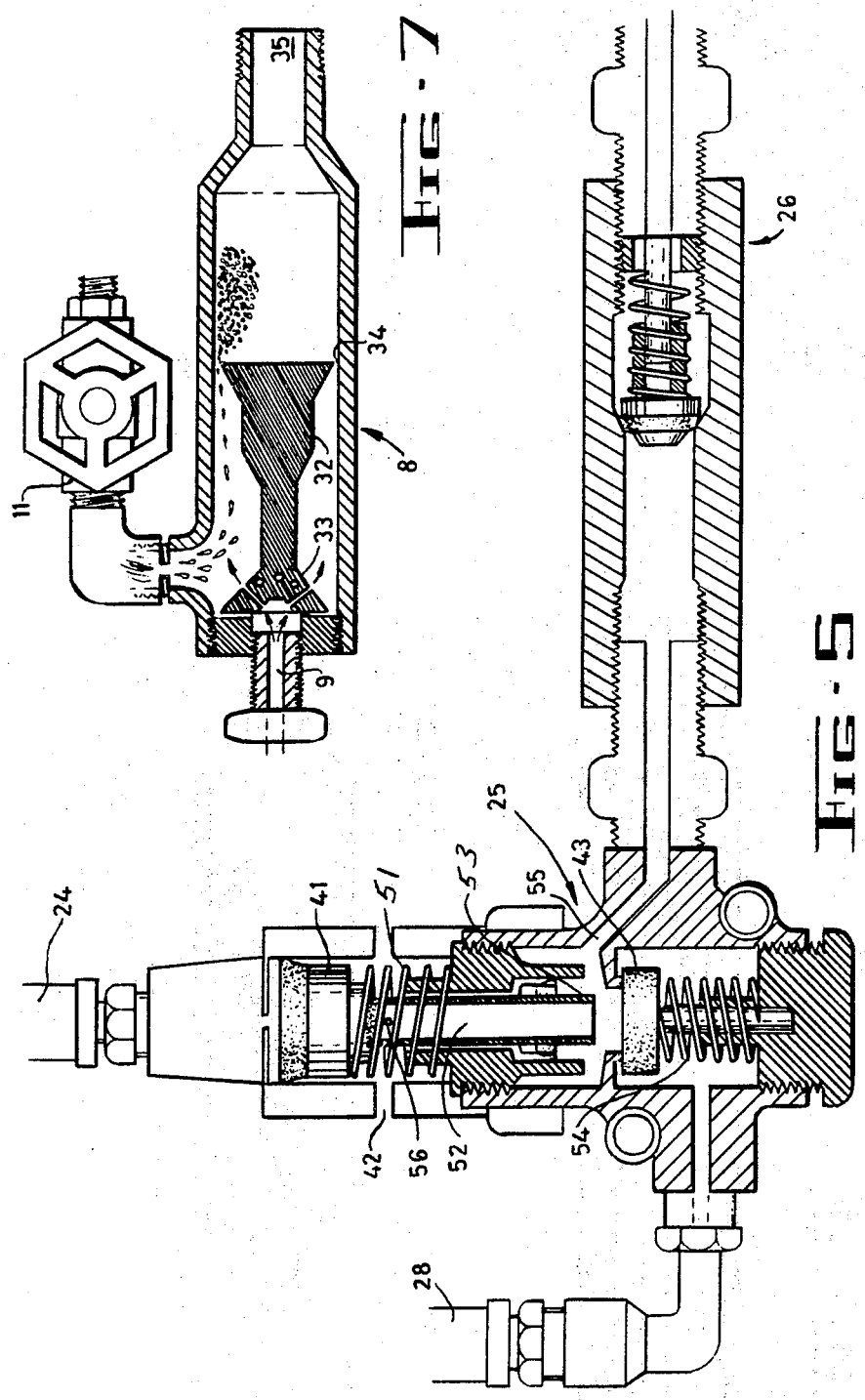

FOAMING SYSTEM AND IMPROVED FOAMING DEVICE

This invention relates to improvements in apparatus for foam cleaning and to improvements in foam cleaning systems.

It has been widely recognised that in many applications, for example in the paper and food industries, that cleaning of equipment can be effected by using foam rather than pressure water sprays. This can be most desirable in many applications as there is little, if any, likelihood of overspray onto products being treated whereas such overspray can readily occur when pressure water is used for cleaning.

Notwithstanding the recognised desirability of foam cleaning there has been a number of different difficulties in providing satisfactory foam cleaners.

All foam cleaners necessitate the mixing, in a foam chamber, of water, an active chemical (normally an alkaline compound), a foaming agent and pressure air. Previously proposed foamers have been of two basic forms. The first has been a form in which the water, the chemical and the foaming agent are premixed and fed to the foam chamber, pressure air being separately fed thereto and in the other water induced by venturi action, the introduction of the chemical and foaming agent, the air being separately introduced.

The first of these forms has been satisfactory in as much that any required proportion of chemical to water has been able to be fed into the foam chamber to provide foam having required properties but generally foamers which use such mixtures have suffered from at least one, and often several, disadvantages. Firstly the foam is normally delivered from a nozzle at the end of a flexible hoze, and when the foam flow has been stopped at the nozzle there has normally been a pressure build-up in the hose leading to the nozzle thereby causing undue pressure on the hose and thus the possibility of hose damage. Secondly in the air line to the foam chamber there has normally been a non-return valve but as on foam shut off there is pressure on both sides of this valve, any fault in the valve could cause leakage into the air system. It will be appreciated that the liquid in the foam chamber can be highly corrosive and if there is leakage this corrosive liquid entering the various air lines of the apparatus and specifically entering pressure regulators in the apparatus can damage these. Also, on some occasions, there could be flow back of corrosive liquid to the pump which could be damaged.

The other conventional form of device had a further disadvantage in that, using a venturi system, the quantity of chemical to be added to the water was restricted and thus control of the foam quality was also restricted and, specifically, it was extremely difficult to make very concentrated dry foam. This limitation was due to the operation of a venturi in that there is a maximum possible induction for any particular venturi at any predetermined flow rate.

The first object of the present invention is to provide a new foamer of the type in which a mixture of at least water, an active chemical and foaming agent is supplied which is safer than previously proposed foamers and which also requires less maintenance and is cheaper to operate over a period.

The second object of the invention is to provide an improved foaming system for use in an area, which system is more effective and safer than systems previously provided.

In a first aspect of the invention we provide a foamer including a foam chamber to which a mixture of, at least, water, an active chemical and foaming agent can be supplied and to which pressure air can be applied and from which foam can be delivered, characterised in that on a pressure build up in the foam chamber due to foam delivery cut off the static pressure in the chamber and in the delivery line is automatically reduced.

This reduction may be achieved by the provision of a pressure sensing line in the foam chamber which actuates a control valve whereby the input air pressure to the chamber is automatically shut off.

In another aspect the inlet air to the foam chamber passes through a shut-off valve which is so arranged that if a non-return valve downstream of the shut-off valve leaks then material returning therethrough is automatically vented to atmosphere and if the pressure in the foam chamber is reduced below the shut-off pressure, then the air pressure is re-applied to the foam chamber thus purging the non-return valve at full air pressure.

In the other aspect of the invention we provide a foam cleaning system including a tank to which may be added water, foaming agent and chemicals, a pump associated with the tank a fluid ring main passing about an area in which cleaning is to be effected and a plurality of foaming points located at various positions within the area and interconnected by the ring main, each foaming point also having an air supply thereto.

In a further aspect of this arrangement we provide a means whereby the amount of chemicals being added to the tank is automatically controlled.

In order that the invention may be more readily understood we shall describe one form of foamer made in accordance with the invention and its association with a system covering an area. These are described in relation to the accompanying drawings, in which:

FIG. 2 is a general view of the foamer of the invention showing the individual components;

FIG. 3 is a section through the automatic control view of FIG. 2;

FIG. 4 is a section through an alternative form of automatic control view;

FIG. 5 is a section through the shut-off valve shown in FIG. 2 in a first condition;

FIG. 6 is a section similar to that of FIG. 5 showing the valve in a second condition; and FIG. 7 is a section through the foamer of FIG. 2.

Figure 1:
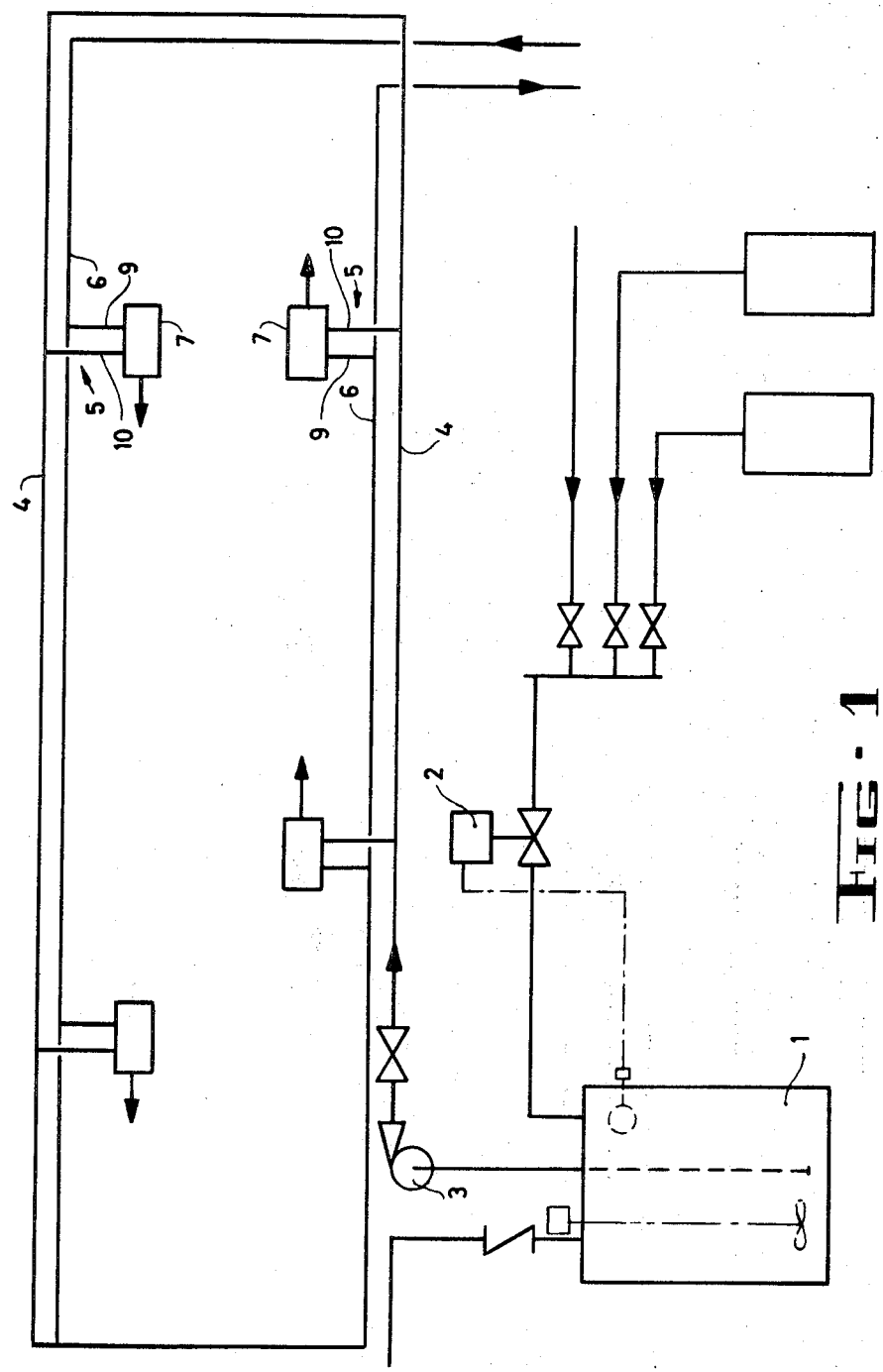
FIG. 1 is a schematic view of the system.

The system illustrated in FIG. 1 may be considered to be useful in a large area in which there may be located equipment or the like which needs to be foam cleaned, and which area could be, for example, up to 400 feet by 30 feet, a not unusual area to be occupied by paper making equipment.

At a point adjacent this area we provide a tank 1 made of material which is not affected by corrosive materials, such as stainless steel and the size of the tank will depend on the output required by the system at any time. The tank may be provided with automatic metering means 2 whereby on the tank reaching a predetermined minimum level of liquid there is automatically supplied to the tank a predetermined quantity of water, foaming agent and chemicals. If necessary the tank may be provided with an agitator of any known form to ensure complete mixing of these liquids.

Associated with the tank is a pressure pump 3 the output of which is selected depending on the number of foaming units to be served by the tank. In practice, if six foaming units adapted to use two gallons per minute of the chemical/water mixture are to be supplied by the system, we select a pump which has an ouput of approximately 15 gallons per minute to ensure maintenance of pressure.

Fitted to the pump is a continous ring main 4 of non-corrosive material, such as stainless steel pipe, which ring passes about the area to be cleaned and may be placed in a position where the likelihood of damage is minimised, as around the ceiling.

Wherever required in this ring main there are provided branches 5 to each of which there may be connected a foamer, as will be described hereinafter. The necessary spacing of the branches 5 depends on the length of hosing which is acceptable in the particular application. In a practical form of device we find that the foam can be sprayed up to 20 feet from the end nozzle attached to the end of the hose and thus, assuming hoses 50 feet long are used a spacing of 140 feet between adjacent foamers is satisfactory. If a 100 feet hose is to be used then a spacing of up to 240 feet would be acceptable.

Also, in the area serviced by the ring main, there must be a supply of pressure air 6 adjacent outlets of the various branches 5.

A foamer 7 can be fitted at each outlet of the ring main and our preferred form of foamer, which is part of the present invention, includes a foam chamber 8 having therein an inlet 9 for pressure air and also an inlet 10 from the ring main.

In order to control the dryness of the foam, we control the amount of liquid being fed to the chamber 8 by a liquid adjustment valve 11 at the liquid inlet. This is somewhat different to that which has been the case in most conventional foamers in that in these the liquid inlet is constant and the wetness or dryness of the foam has been controlled by varying the air pressure. The air line from the supply 6 passes through a supply valve 12 to which is connected a primary pressure regulator 13 which is manually adjustable and is provided with a pressure gauge 14 so that the required inlet pressure can be obtained. This regulator is normally adjusted to provide a pressure of 80 p.s.i. at its outlet.

The outlet of the primary pressure regulator 13 diverges into three branches. Branch 15 passes through an oil mist lubricator 16 and the outlet from this lubricator passes to an automatic control valve 17. In the foamer of FIG. 2 the control valve illustrated in FIG. 3 is actuated by a diaphragm 18, as illustrated the valve is open and air can pass from its inlet 19 to its outlet 20. To the side 21 of the diaphragm 18 which causes the valve to open we supply air from the second branch 22 of the outlet of the primary pressure regulator 13 to which branch there is connected a secondary pressure regulator 23 which can be adjusted to any desired pressure. The connection to the other side of the diaphragm 18 will be described hereinafter.

The output 20 of the automatic control valve 17 is connected to a hose 24 which is also connected to a shut-off valve 25, which will be described more fully hereinafter, to a non-return valve 26 from which it passes to the foam chamber 8.

Outlet 20 can also be used as a source of air to drive an air operated liquid pump, if the foamer is to be used as a single unit rather than in the system as illustrated. Such additional outlet is shown as outlet 28 from the valve.

The third branch 27 of the outlet from the first pressure regulator 13 also passes by means of hose 28 to the shut-off valve 25 but to a part of this valve different from the hose 24 from the control valve 17.

From the foam chamber 8 there is provided a line 29 which is connected to chamber 30 of the diaphragm away from the point of connection of line 31, on the secondary regulator 23. As line 29 is designed to carry corrosive liquids from the foam chamber it must be made of a corrosive resistant material, such as a nitrite lined hydraulic hose and the diaphragm chamber 30 to which liquid is passed must also be made of a material which resists corrosion, such as stainless steel or a plated material. The diaphragm 18 must be strongly resistent as any diaphragm failure would permit corrosive liquid to pass to the automatic control valve 17 and through the secondary pressure regulator 23 to the primary pressure regulator 13 and even back through the lines to other pieces of equipment in the air system thus possibly causing considerable damage.

The foam chamber illustrated in FIG. 7 includes a foam forming member 32 which has a tapered rearward part 33 which has a plurality of holes about its periphery which holes are connected to the inlet 9 and distribute air in a predetermined pattern within the chamber. The member 32 is formed to provide a restricted annular passage 34 which we have found to aide in foaming. From the outlet 35 of the foam chamber we provide a hose 36 which may, as previously discussed, be of any required length and at the end of this hose we have a shut-off valve 37 which can be manipulated by an operator and to this we connect a wand 38 with an outlet nozzle 39. In practice we provide a wand which has substantial length, for example 42" but it will be understood that depending upon what is being cleaned by the foamer the form of wand can vary greatly.

When foaming is to commence liquid passes through the liquid adjustment valve 11 to the foam chamber 8 and the air from the automatic control valve 17 passes to the shut-off valve 25 where it causes valve member 41 to move downwardly against spring 51 and causes the hollow plunger 52 to move downwardly until the extension 53 thereon contacts the valve member 43, compresses its spring 54 and permits air to pass from line 28 through passage 55 in the valve to the non-return valve 26, which is thereby opened, and into the foam chamber 8 where the foam is formed.

This foam passes through the hose 36, the open shut-off valve 37 to the wand 38 from which it is delivered through nozzle 39. Adjustment of the liquid control valve can vary the wetness or dryness of the foam as required by an operator. It will be appreciated that at this time the pressure within the foam chamber 8 is less than the static pressure therein before delivery. When the operator closes the shut-off valve 37 there is an immediate build up of pressure in the foam chamber and two things occur. Firstly the non-return valve 26 closes to prevent liquid or foam passing back through the shut-off valve to the automatic control valve 17. At the same time the pressure in chamber 30 on the underside of the diaphragm 18 is increased. As soon as this pressure is sufficient to overcome the pressure in chamber 21 on the upper side of the diaphragm, which is controlled by the secondary pressure regulator 23, then the stem 40 of the automatic control valve moves upwardly and the valve is closed, the air pressure in line 24 thus drops and spring 51 causes the valve member 41 to move upwardly permitting spring 54 to close valve 43 so that air pressure at the inlet to the non-return valve 26 is reduced as is the pressure of air in the foam chamber. As soon as the shut-off valve 37 is again opened the pressure on the underside of the diaphragm drops, the automatic control valve opens and pressure air can pass through the non-return valve to the foam chamber. Thus under normal operating circumstances the pressure in the hose, which is the most vulnerable part of the system, is never higher than the pressure set on the secondary regulator.

If the non-return valve 26 leaks it can be appreciated that corrosive material from the foam chamber could return through the shut-off valve 25 to the automatic control valve 17 and from this to the secondary pressure regulator 23 the primary pressure regulator 13 and possibly to the remainder of the air system.

In order to avoid the likelihood of such damage the automatic shut-off valve 25 is designed to prevent any material liquid from passing therebeyond.

If the non-return valve 26 does leak, liquid can pass through passage 55 into the body of the valve and through the centre of the plunger 52 via apertures 56 in the upper end of this plunger to air through aperture 42 in the body of the valve. This is the condition illustrated in FIG. 5.

If this leakage continues the pressure in the foam chamber 8 drops so the pressure on the underside of the diaphragm 18 drops, the control valve 17 opens, air is provided to the shut-off valve 25 which causes valve 43 to open and pressure air to be applied to the foam chamber whilst, at the same time, forcing liquid from the body of the valve 25 through the non-return valve 26. As in the situation described the output from the foam chamber is still cut off there is a rapid pressure build up in the foam chamber the automatic control valve 17 is again actuated thereby cutting off the air flow to the foam chamber. This action becomes repetitive and we have found that under many circumstances this automatically cleanses the non-return valve 26 so that it once again operates correctly. If the valve does not become cleansed the cyclic operation will continue as long as no foam is being made and it would be necessary to strip and examine the non-return valve.

In FIG. 4 we show an alternative form of automatic control valve. In this form there is an inlet 45 an outlet 46 and a moveable valve member 47. The valve member is arranged to be normally open or openable by pressure inlet by means of spring 48 acting against the diaphragm 49. An inlet 50 to the underside of the diaphragm 49 designed to be connected to the foam chamber and when pressure in the foam chamber increases the diaphragm 49 is moved causing the valve to close or at least partially close. It will be seen that this valve is not as simple to adjust as was the type illustrated in relation to FIG. 3, this is nevertheless cheaper than that form and can be satisfactory in many applications.

In the specific embodiment described we have treated the foamer illustrated in FIG. 2 as being connected to a system of the type illustrated in FIG. 1. Of course, it is quite possible to use a single foamer which can be more or less portable and in such an arrangement the mixture of chemicals, foaming material and water can be made up in a small container and the liquid can be pumped to the foam chamber by means of a pneumatically operated pump. Thus the only connection needed by the unit is an air connection. In such cases of course an air compressor can be made part of the foamer unit and if this was motor driven then it would be fully portable and if it was electrically driven it would be only necessary to connect the unit to a source of electric power.

I claim:

1. A foaming system comprising a foam chamber for receiving at least a foaming agent, a delivery line connected to said foam chamber for delivering the foam generated therein to a preselected location, air conduit means adapted to be connected between a source of pressurized air and to said foam chamber for supplying pressurized air to said foam chamber, said air conduit means comprising control means connected to said foam chamber and responsive to the pressure in said chamber rising above a predetermined value for stopping the flow of said pressurized air from the source to said foam chamber.

2. A foaming system as in claim 1, in which said control means comprises an air control valve having an air passage, and a pressure sensing line connected between said foam chamber and said control valve, said control valve having a valve member movable from a first position wherein said air passage is open to permit the flow of air therethrough to a second position when the pressure is said line exceeds said predetermined value wherein said air passage is closed to prevent the flow of said pressurized air therethrough.

3. A foaming system as claimed in claim 2 wherein the air control valve comprises a valve having a diaphragm therein, said sensing line being connected to one side of said diaphragm, and a source of air, at a predetermined pressure sufficient to maintain the valve open during delivery of said foam, being connected to the other side of the diaphragm.

4. A foaming system as claimed in claim 2 wherein the air control valve comprises a valve having a diaphragm therein, said sensing line being connected to one side of said diaphragm, and a spring exterting a force against the other side of the diaphragm, the pressure exerted by said spring being sufficient to maintain the valve open during delivery of said foam.

5. A foaming system as in claim 1, wherein said foam chamber is provided with an air inlet through which said pressurized air flows, said air conduit means further comprising a non-return valve connected to said air inlet, and a shut-off valve connected upstream of said non-return valve, said shut-off valve having valve means therein movable from a first position to permit pressurized air to flow through said valve to a second position in response to pressure in said chamber above said predetermined value for stopping the flow of pressurized air through said valve and for venting to the atmosphere liquid leaking past said non-return valve.

6. A foaming system as in claim 5, wherein said shut-off valve is connected between said source of pressurized air and said foam chamber, said control means comprising a valve movable from an open position to permit the flow of a fluid therethrough to a closed position in response to the pressure in said chamber above said predetermined value to prevent flow of the fluid therethrough, means interconnecting said control means valve and said shut-off valve whereby fluid from the control means valve operates said shut-off valve valve means to the first position and the lack of fluid flow from said control means valve permits movement of said shut-off valve valve means to the second position.

7. A foamer comprising an air source, a pressure regulator having an outlet with at least two branches, an air control valve connected to one of said branches, a shut-off valve and a non-return valve connected in series, said air control valve having an outlet connected to said shut-off valve, a foam chamber, said non-return valve having an outlet connected to said foam chamber, a source of pressurized air connected to said shut-off valve whereby when said shut-off valve is in the open position pressurized air flows through said shut-off valve to said foam chamber and when said shut-off valve is in the closed position pressurized air is prevented from flowing to said foam chamber, vent means in said shut-off valve operable when said valve is in the closed position to provide a path from said non-return valve to the atmosphere, inlet means connected to said foam chamber to permit entrance of a liquid, an outlet connected to said foam chamber to permit discharge of foam, said shut-off valve having valve means responsive to air flow from said air control valve for operating said shut-off valve to the valve open position, said air control valve being responsive to pressure in said foaming chamber above a predetermined level for preventing air flow from said shut-off valve, and line means connecting said foam chamber with said air control valve to permit said air control valve to sense the pressure in said foaming chamber.

8. A foam cleaning system comprising storage means for a liquid, a pump associated with said storing means to deliver the liquid under a predetermined pressure, a liquid main in the area to be served by the main system having at least one branch, a foamer including a foam chamber to which a mixture of at least water, an active chemical and a foaming agent can be supplied, a delivery line connected to said foam chamber for delivering the foam generated therein to a preselected location, air conduit means adapted to be connected between a source of pressurized air and to said foam chamber for supplying pressurized air to said foam chamber, said air conduit means comprising control means connected to said foam chamber and responsive to the pressure in said chamber above a predetermined value for stopping the flow of said pressurized air from the source to said foam chamber.

9. A system as claimed in claim 8, wherein a plurality of branches are provided each adapted to be connected to a foamer.

* * * * *